United States Patent
Gronvall et al.

(10) Patent No.: US 10,001,608 B2
(45) Date of Patent: *Jun. 19, 2018

(54) WAVE DIVISION MULTIPLEXER ARRANGEMENT FOR SMALL CELL NETWORKS

(71) Applicant: CommScope Technologies LLC, Hickory, NC (US)

(72) Inventors: Erik J. Gronvall, Bloomington, MN (US); Trevor D. Smith, Eden Prairie, MN (US); Timothy G. Badar, Redwood City, CA (US); Anthony L. Lefebvre, Edina, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/252,947

(22) Filed: Aug. 31, 2016

(65) Prior Publication Data

US 2017/0052335 A1  Feb. 23, 2017

Related U.S. Application Data

(63) Continuation of application No. 14/468,913, filed on Aug. 26, 2014, now Pat. No. 9,438,513.

(Continued)

(51) Int. Cl.
*H04J 14/00* (2006.01)
*G02B 6/42* (2006.01)
(Continued)

(52) U.S. Cl.
CPC ......... *G02B 6/4248* (2013.01); *G02B 6/2938* (2013.01); *G02B 6/3897* (2013.01);
(Continued)

(58) Field of Classification Search
CPC .. G02B 6/3897; G02B 6/4444; G02B 6/4471; G02B 6/4251; G02B 6/1203;
(Continued)

(56) References Cited

U.S. PATENT DOCUMENTS 5,859,717 A  1/1999  Scobey et al.
6,561,701 B1  5/2003  Liu et al.
(Continued)

FOREIGN PATENT DOCUMENTS

EP  1 227 605 A2  7/2002
JP  4156708 B2  9/2008
(Continued)

OTHER PUBLICATIONS

International Search Report and Written Opinion for Application No. PCT/US2014/052676 dated Nov. 28, 2014.

(Continued)

*Primary Examiner* — Hibret Woldekidan
(74) *Attorney, Agent, or Firm* — Merchant & Gould P.C.

(57) ABSTRACT

A passive optical network includes a central office providing subscriber signals; a fiber distribution hub including an optical power splitter and a termination field; and a drop terminal. Distribution fibers have first ends coupled to output ports of a drop terminal and second ends coupled to the termination field. A remote unit of a DAS is retrofitted to the network by routing a second feeder cable from a base station to the hub and coupling one the distribution fibers to the second feeder cable. The remote unit is plugged into the corresponding drop terminal port, for example, with a cable arrangement having a sealed wave division multiplexer.

17 Claims, 5 Drawing Sheets

Related U.S. Application Data

(60) Provisional application No. 61/869,984, filed on Aug. 26, 2013.

(51) Int. Cl.
| | | |
|---|---|---|
| *H04Q 11/00* | (2006.01) | |
| *H04L 12/721* | (2013.01) | |
| *H04B 10/2575* | (2013.01) | |
| *G02B 6/293* | (2006.01) | |
| *G02B 6/38* | (2006.01) | |
| *G02B 6/44* | (2006.01) | |
| *H04J 14/02* | (2006.01) | |

(52) U.S. Cl.
CPC .......... *G02B 6/4251* (2013.01); *G02B 6/443* (2013.01); *G02B 6/4422* (2013.01); *G02B 6/4446* (2013.01); *H04B 10/25754* (2013.01); *H04J 14/02* (2013.01); *H04L 45/62* (2013.01); *H04Q 11/0067* (2013.01); *H04Q 2011/0069* (2013.01)

(58) Field of Classification Search
CPC .... G02B 6/4248; G02B 6/2938; G02B 6/443; G02B 6/4422; G02B 6/4446; H04J 14/0282; H04J 14/02; H04L 45/62; H04B 10/807; H04B 10/25753; H04B 10/25754; H04Q 2201/10; H04Q 11/0067; H04Q 2011/0069
USPC ......... 398/68, 73, 79, 70–72, 83; 385/14, 94
See application file for complete search history.

(56) References Cited

U.S. PATENT DOCUMENTS

| | | | |
|---|---|---|---|
| 7,751,672 B2 | 7/2010 | Smith et al. | |
| 8,249,452 B2 | 8/2012 | Biegert et al. | |
| 8,349,649 B2 * | 1/2013 | Kurita | H01L 23/3121 257/686 |
| 8,374,476 B2 | 2/2013 | Reagan et al. | |
| 8,532,490 B2 * | 9/2013 | Smith | H04B 10/25754 398/115 |
| 8,649,649 B2 * | 2/2014 | Smith | G02B 6/46 385/135 |
| 8,837,940 B2 | 9/2014 | Smith et al. | |
| 8,929,740 B2 * | 1/2015 | Smith | H04B 10/25754 398/115 |
| 9,078,287 B2 | 7/2015 | Khemakhem et al. | |
| 9,377,599 B2 * | 6/2016 | Smith | G02B 6/3897 |
| 9,414,137 B2 * | 8/2016 | Smith | G02B 6/483 |
| 9,438,342 B2 * | 9/2016 | Smith | H04B 10/25754 |
| 9,438,513 B2 * | 9/2016 | Gronvall | H04Q 11/0067 |
| 2006/0153517 A1 * | 7/2006 | Reagan | G02B 6/3897 385/135 |
| 2008/0114580 A1 | 5/2008 | Chin et al. | |
| 2009/0087183 A1 | 4/2009 | Heywood et al. | |
| 2009/0110359 A1 | 4/2009 | Smith et al. | |
| 2009/0196616 A1 | 8/2009 | Bolster et al. | |
| 2009/0269054 A1 | 10/2009 | Smith | |
| 2010/0329623 A1 | 12/2010 | Smith et al. | |
| 2011/0217015 A1 | 9/2011 | Smith et al. | |
| 2011/0311226 A1 * | 12/2011 | Smith | G02B 6/483 398/45 |
| 2012/0002918 A1 * | 1/2012 | Kawashima | G02B 6/1203 385/24 |
| 2012/0165902 A1 | 6/2012 | Sommer et al. | |
| 2013/0089336 A1 | 4/2013 | Dahlfort et al. | |
| 2013/0209099 A1 | 8/2013 | Reagan et al. | |
| 2013/0216187 A1 * | 8/2013 | Dowling | H04Q 11/0003 385/71 |
| 2014/0219621 A1 | 8/2014 | Barnette, Jr. et al. | |
| 2014/0248057 A1 | 9/2014 | Li et al. | |
| 2014/0254986 A1 | 9/2014 | Kmit et al. | |
| 2014/0347839 A1 | 11/2014 | Shah et al. | |
| 2015/0155940 A1 | 6/2015 | Smith et al. | |
| 2015/0192741 A1 | 7/2015 | Dowling | |
| 2015/0249520 A1 | 9/2015 | Badar et al. | |
| 2015/0334476 A1 | 11/2015 | Smith et al. | |
| 2016/0028485 A1 | 1/2016 | Khemakhem et al. | |
| 2016/0085032 A1 | 3/2016 | Lu et al. | |

FOREIGN PATENT DOCUMENTS

| | | |
|---|---|---|
| WO | WO 2009/097388 A1 | 8/2009 |
| WO | WO 2011/139942 A1 | 11/2011 |
| WO | WO 2014/167447 A1 | 10/2014 |

OTHER PUBLICATIONS

Extended European Search Report for Application No. 14841237.2 dated Mar. 7, 2017.

* cited by examiner

WAVE DIVISION MULTIPLEXER ARRANGEMENT FOR SMALL CELL NETWORKS

CROSS REFERENCE TO RELATED APPLICATIONS

This application is a continuation of application Ser. No. 14/468,913, filed Aug. 26, 2014, which issued as U.S. Pat. No. 9,438,513, which application claims the benefit of provisional application Ser. No. 61/869,984, filed Aug. 26, 2013, and titled "Wave Division Multiplexer Arrangement for Small Cell Networks," which applications are incorporated herein by reference in their entirety.

BACKGROUND

Fiber optic telecommunications technology is becoming more prevalent as service providers strive to deliver higher bandwidth communication capabilities to customers/subscribers. The phrase "fiber to the x" (FTTX) generically refers to any network architecture that uses optical fiber in place of copper within a local distribution area. Example FTTX networks include fiber-to-the-node (FTTN) networks, fiber-to-the-curb (FTTC) networks, and fiber-to-the-premises (FTTP) networks.

FTTN and FTTC networks use fiber optic cables that are run from a service provider's central office to a cabinet serving a neighborhood. Subscribers connect to the cabinet using traditional copper cable technology, such as coaxial cable or twisted pair wiring. The difference between an FTTN network and an FTTC network relates to the area served by the cabinet. Typically, FTTC networks have cabinets closer to the subscribers that serve a smaller subscriber area than the cabinets of FTTN networks.

In an FTTP network, fiber optic cables are run from a service provider's central office all the way to the subscribers' premises. Example FTTP networks include fiber-to-the-home (FTTH) networks and fiber-to-the-building (FTTB) networks. In an FTTB network, optical fiber is routed from the central office over an optical distribution network to an optical network terminal (ONT) located in or on a building. The ONT typically includes active components that convert the optical signals into electrical signals. The electrical signals are typically routed from the ONT to the subscriber's residence or office space using traditional copper cable technology. In an FTTH network, fiber optic cable is run from the service provider's central office to an ONT located at the subscriber's residence or office space. Once again, at the ONT, optical signals are typically converted into an electrical signal for use with each subscriber's devices. Of course, to the extent that subscribers have devices that are compatible with optical signals, conversion of the optical signal to an electrical signal may not be necessary.

FTTP networks include active optical networks and passive optical networks. Active optical networks use electrically powered equipment (e.g., a switch, a router, a multiplexer, or other equipment) to distribute signals and to provide signal buffering. Passive optical networks use passive beam splitters instead of electrically powered equipment to split optical signals. In a passive optical network, ONT's are typically equipped with equipment (e.g., wave-division multiplexing and time-division multiplexing equipment) that prevents incoming and outgoing signals from colliding and that filters out signals intended for other subscribers.

FIG. 1 illustrates a FTTP network 100 deploying passive fiber optic lines. As shown, the network 100 can include a central office 101 that connects a number of end subscribers 105 in a network. The central office 101 can additionally connect to a larger network, such as the Internet (not shown) and a public switched telephone network (PSTN). The various lines of the network 100 can be aerial or housed within underground conduits.

The network 100 also can include fiber distribution hubs (FDHs) 103 having one or more optical splitters (e.g., 1-to-8 splitters, 1-to-16 splitters, or 1-to-32 splitters) that generate a number of distribution fibers that may lead to the premises of an end user 105. In typical applications, an optical splitter is provided prepackaged in an optical splitter module housing and provided with a splitter output in pigtails that extend from the module. The splitter output pigtails are typically connectorized with, for example, SC, LC, or LX.5 connectors. The optical splitter module provides protective packaging for the optical splitter components in the housing and thus provides for easy handling for otherwise fragile splitter components. This modular approach allows optical splitter modules to be added incrementally to FDHs 103 as required.

The portion of the network 100 that is closest to central office 101 is generally referred to as the F1 region, where F1 is the "feeder fiber" from the central office 101. The portion of the network 100 closest to the end users 105 can be referred to as an F2 portion of network 100. The F2 portion of the network 100 includes distribution cables routed from the FDH 103 to subscriber locations 105. For example, the distribution cables can include break-out locations 102 at which branch cables are separated out from the main distribution lines. Branch cables are often connected to drop terminals 104 that include connector interfaces for facilitating coupling of the fibers of the branch cables to a plurality of different subscriber locations 105 (e.g., homes, businesses, or buildings). For example, fiber optic drop cables can be routed directly from a breakout location 102 on the distribution cable to an ONT at a subscriber location 105. Alternatively, a stub cable can be routed from a breakout location of the distribution cable to a drop terminal 104. Drop cables can be run from the drop terminal 104 to ONT's located at premises 105 located near the drop terminal 104.

Distributed Antenna Systems (DAS) also are becoming more prevalent. DAS are used to provide wireless service (e.g., cell phone, WIFI, etc.) within a given geographic area. DAS include a network of spaced-apart antenna nodes optically or electrically connected to a common control location (e.g., a base station). Each antenna node typically includes an antenna and a remote unit (i.e., a radio head, a remote transceiver, etc.).

DAS enable a wireless cellular service provider to improve the coverage provided by a given base station or group of base stations. In DAS, radio frequency (RF) signals are communicated between a host unit and one or more remote units. The host unit can be communicatively coupled to one or more base stations directly by connecting the host unit to the base station using, for example, electrical or fiber telecommunications cabling. The host unit can also be communicatively coupled to one or more base stations wirelessly, for example, using a donor antenna and a bi-directional amplifier (BDA). One or more intermediate devices (also referred to here as "expansion hubs" or "expansion units") can be placed between the host unit and the remote units in order to increase the number of remote units that a single host unit can feed and/or to increase the hub-unit-to-remote-unit distance.

RF signals transmitted from the base station (also referred to here as "downlink RF signals") are received at the host unit. The host unit uses the downlink RF signals to generate a downlink transport signal that is distributed to one or more of the remote units. Each such remote unit receives the downlink transport signal and reconstructs the downlink RF signals based on the downlink transport signal and causes the reconstructed downlink RF signals to be radiated from at least one antenna coupled to or included in that remote unit.

A similar process is performed in the uplink direction. RF signals transmitted from mobile units (also referred to here as "uplink RF signals") are received at each remote unit. Each remote unit uses the uplink RF signals to generate an uplink transport signal that is transmitted from the remote unit to the host unit. The host unit receives and combines the uplink transport signals transmitted from the remote units. The host unit reconstructs the uplink RF signals received at the remote units and communicates the reconstructed uplink RF signals to the base station. In this way, the coverage of the base station can be expanded using the DAS.

One general type of DAS is configured to use optical fibers to communicatively couple the host unit to the remote units and/or expansions hubs. However, such a fiber-optic DAS typically makes use of dedicated optical fibers that are deployed specifically to support that DAS.

SUMMARY

Features of the present disclosure relate to methods and systems for efficiently and cost effectively distributing fiber optic communications services to a local area while concurrently supporting a Distributed Antenna System.

Aspects of the disclosure are related to a passive optical network including first and second signal sources, a fiber distribution hub receiving signals from both sources, and a drop terminal receiving both signals from the fiber distribution hub. The drop terminal outputs the first signals at one or more ports and outputs the second signals at one or more other ports.

Other aspects of the disclosure are related to a cable arrangement that facilitates feeding a small cell covering multiple bands and/or multiple providers with a single dark fiber in a passive optical network. In some implementations, the cable arrangement includes a sealed wave division multiplexer having a connectorized input fiber and multiple connectorized output fibers. Each output fiber carries one or more of the optical signals carried over the input fiber, each optical signal having its own wavelength.

The connectorized end of the input fiber of the cable arrangement can be plugged into an output port of a drop terminal (e.g., a multi-service terminal) of a passive optical network. For example, the input fiber can be plugged into an empty port of a drop terminal that otherwise services homes, businesses, or other buildings of end subscribers.

The output fibers of the cable arrangement can be plugged into input ports (Rx) and output ports (Tx) of a DAS remote access unit (e.g., remote radio head). Each pair of ports (Rx, Tx) corresponds with a different provider (e.g., a mobile phone service provider) and/or different telecommunications standard (e.g., LTE, 4G, and 3G, such as GSM, CDMA, EDGE, UMTS, DECT, WiMAX). For example, a first pair of fibers can bi-directionally carry a signal corresponding to a first band for a first provider; a second pair of fibers can bi-directionally carry a signal corresponding to a second band for the first provider; and a third pair of fibers can bi-directionally carry a signal corresponding to a first band for a second provider.

In certain implementations, one or more of the optical connectors of the cable arrangement can be hardened connectors. For example, the input fiber can be terminated by a hardened (i.e., environmentally sealed) connector and plugged into an output port of a drop terminal mounted to a power line pole, light pole, or other such outdoor structure. The output fibers can be terminated by hardened connectors and plugged into ports of an outdoor remote unit for a DAS. In other implementations, the input and/or output connectors of the cable arrangement can be non-hardened (i.e., not environmentally-sealed). For example, such output connectors can be plugged into an indoor remote access unit.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
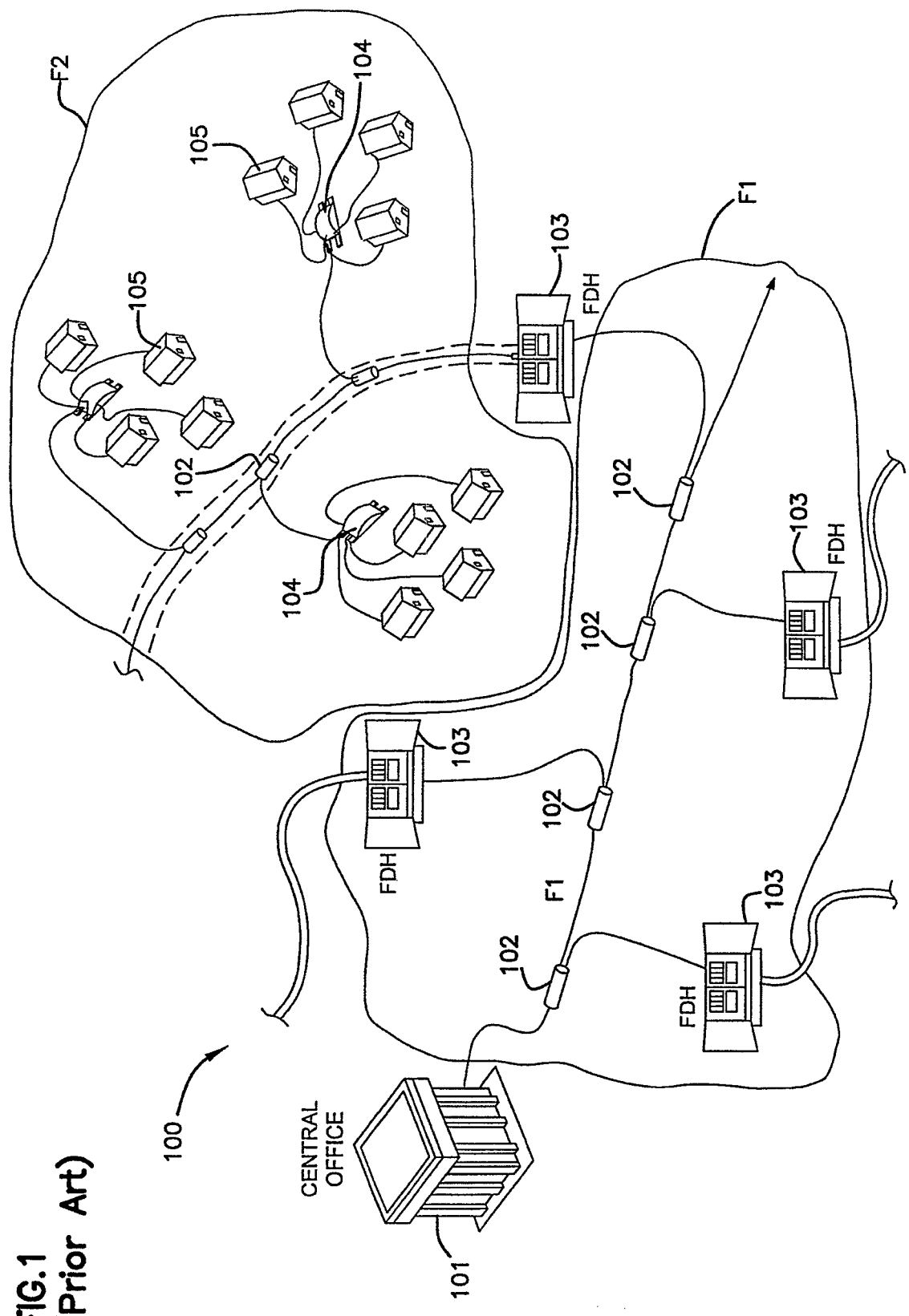
FIG. 1 is a schematic diagram of an FTTP network deploying passive fiber optic lines.

An aspect of the present disclosure relates to a fiber optic network including at least one fiber distribution hub (FDH) and a plurality of drop terminals (i.e., multi-service terminals) that are optically connected to the FDH by optical distribution cables. The fiber optic network can be used to connect end subscribers (e.g., subscribers 105 of FIG. 1) to a central office (e.g., central office 101 of FIG. 1). Remote radio heads of a Distributed Antenna System (DAS) also can be connected to the fiber optic network.

For example, a first feeder cable can be used to connect a first signal source (e.g., at a central office) to an FDH; drop cables can be used to connect the subscriber locations to the drop terminals; and distribution cables can be used to connect the drop terminals to the FDH to provide a first type of service. A second feeder cable can be used to connect a second signal source (e.g., at a base station) to the FDH; drop cables can be used to connect the antenna nodes to the drop terminals; and the distribution cables connect the drop terminals to the FDH to provide a second type of service. In certain implementations, the antenna nodes and the second source can be retrofitted to an existing optical network. In some such implementations, one or more of the same components (e.g., FDH, distribution cables, drop terminals) can be used for both types of services.

Figure 2:
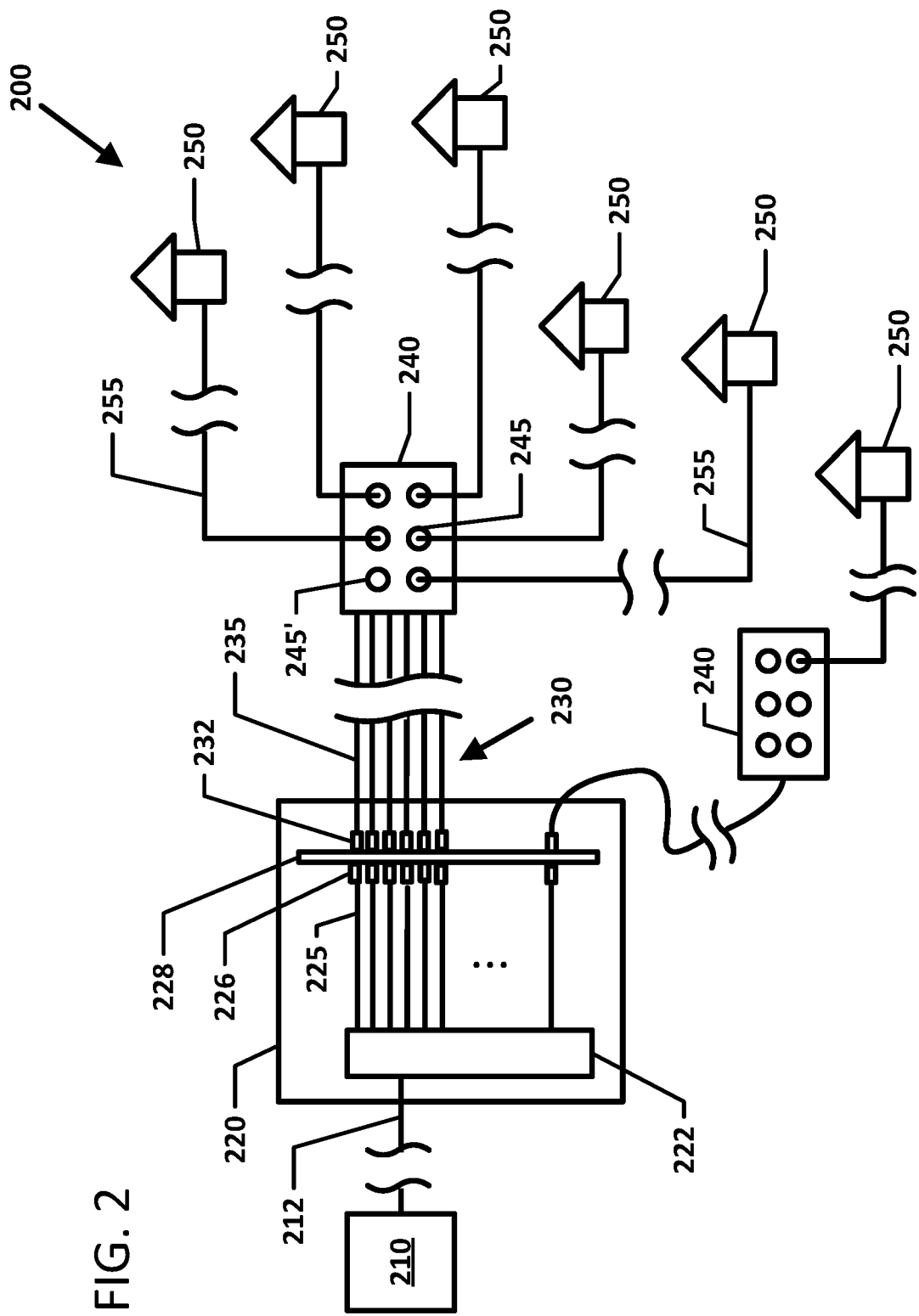
FIG. 2 is a schematic diagram of an FTTP network including a drop terminal and FDH.

FIG. 2 is a schematic diagram of an example optical network 200 that connects a first signal source (e.g., a central office) 210 to end subscribers 250. A first feeder cable 212 connects the first signal source 210 to an FDH 220. One or more fibers (e.g., single-mode fibers) of the first feeder cable 212 are routed to a passive optical splitter 222, which splits signals carried over the feeder cable 212 onto splitter pigtails 225. The splitter pigtails 225 are optically coupled to fibers 235 of a distribution cable 230, which are routed out of the FDH 220. For example, within the FDH 220, connectorized ends 226 of the splitter pigtails 225 can be routed to a termination field 228 at which they are optically coupled to connectorized ends 232 of the distribution fibers 235.

The splitter 222 includes at least one passive optical power splitter. Passive optical power splitters (e.g., 1 to 8 splitters, 1 to 16 splitters, 1 to 32 splitters, 1 to 64 splitters, etc.) split signals from one to many and combine signals from many to one without providing any wavelength filtration. In the case of a 1 to 8 splitter, each of the split signals has $\frac{1}{8}^{th}$ the power of the input signal.

The distribution cable 230 is routed from the FDH 220 to at least one drop terminal 240. The fibers 235 of the distribution cable 230 are optically coupled to output ports 245 of the drop terminal 240. Drop cables 255 extend between the output ports 245 of the drop terminal 240 and the end subscribers 250. For example, each drop cable 255 can connect one of the end subscribers (e.g., a house, a business, a building, etc.) to one of the drop terminal ports 245. In some implementations, the drop terminal 240 has between two and sixteen ports 245. In certain implementations, the drop terminal 240 has between four and twelve ports 245. In an example, the drop terminal has six ports 245. In an example, the drop terminal has eight ports 245.

In some implementations, a drop terminal 240 may have one or more empty ports 245' that are not connected to subscribers 250. If a new subscriber joins the network (i.e., requests the first type of service), then a drop cable 255 can be plugged into one of the empty ports 245' to extend service to the subscriber 250. Of course, a drop terminal port 245 may become empty be disconnecting or adjusting the connection of an existing subscriber 250.

Figure 3:
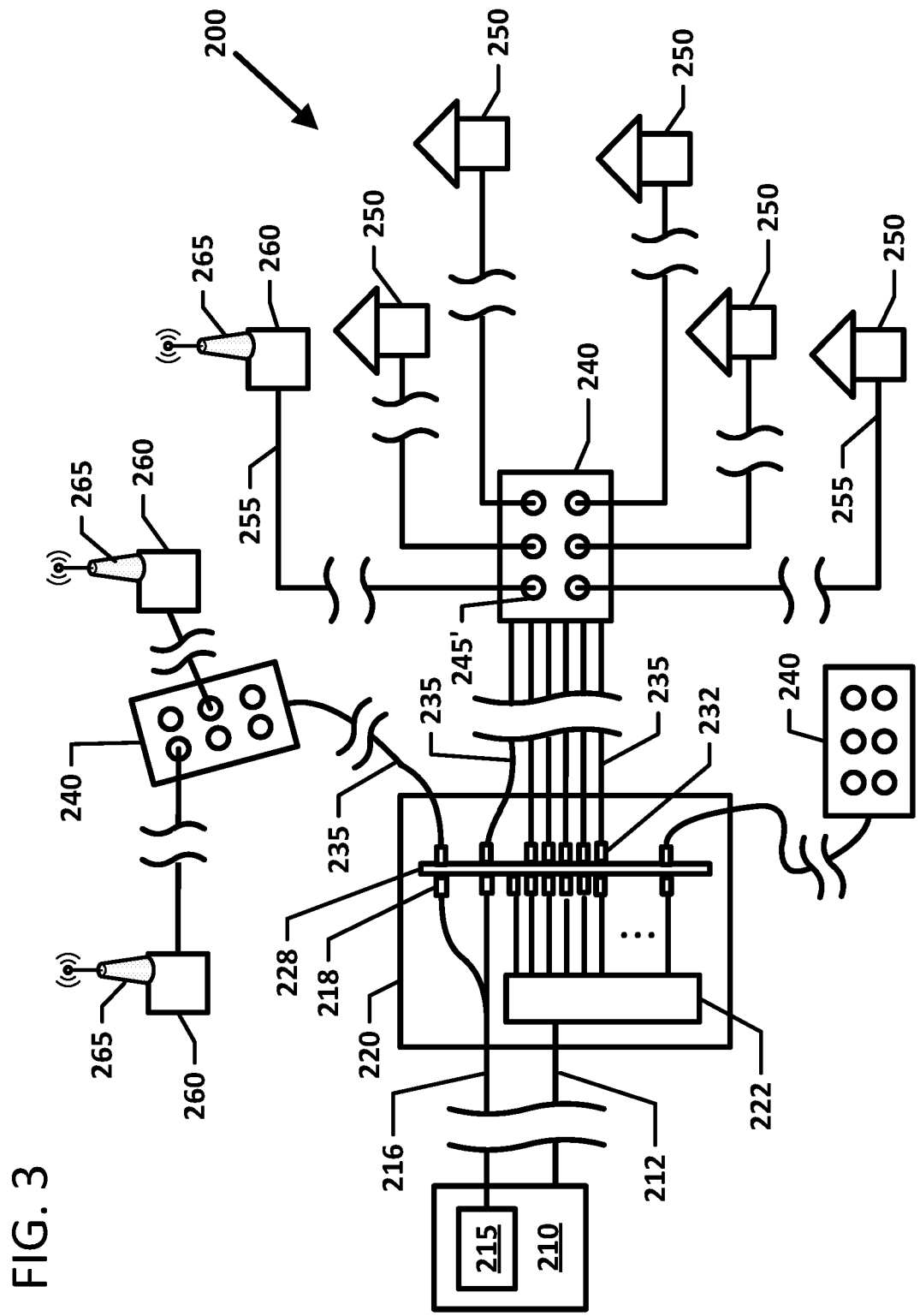
FIG. 3 is a schematic diagram of the FTTP network of FIG. 2 with a base station and remote unit retrofitted to the network.

According to some aspects of the disclosure, one or more remote units of a DAS can be coupled to the optical network 200. For example, as shown in FIG. 3, one or more of the remote units (e.g., remote radio heads) 260 can be connected to one of the empty drop terminal ports 245'. The empty port 245' can be connected to a second signal source 215 via a second feeder cable 216 at the FDH 220. The second signal source 215 includes one or more lasers capable of transmitting beams of light over narrow bands with narrow gaps between the bands. Each remote unit 260 includes an antenna 265 for wirelessly broadcasting the optical signals carried over the second feeder cable 216.

In some implementations, the base station 215 is located within the central office 210 (e.g., see FIG. 3). In other implementations, the base station 215 can be located remote from the central office 210. The base station 215 includes active electrical components for managing the various signals fed back and forth between the antenna nodes 265 and the base station 260. For example, the base station 215 can include a plurality of transceivers for receiving and transmitting signals and a power amplifier for amplifying the signals. The base station 215 can be configured for any one or more telecommunications standards including 3G (e.g., GSM, EDGE, UMTS, CDMA, DECT, WiMAX, etc.), LTE, and 4G. In one embodiment, the base station 215 includes optical multiplexers (e.g., wavelength division multiplexers) to join signal into a multiplexed signal transmitted through the second feeder cable 216 to the FDH 220 and to separate the multiplexed signal received from the FDH 220 into separate signals to be carried back over the second feeder cable 216.

At the FDH 220, one or more connectorized ends 218 of the second feeder cable 216 can be plugged into the termination field 228. In certain implementations, the second feeder cable 216 is not split before being plugged into the termination field 228 (i.e., the optical signals carried by the second feeder are not passed through an optical power splitter). The connectorized end of a distribution fiber 235 routed to an empty drop terminal port 245' can be optically coupled to the second feeder connectorized end 218 at the termination field 228 (see FIG. 3). Accordingly, the empty port 245' receives the optical signals (e.g., the multiplexed optical signal) carried over the second feeder 216 from the base station 215.

At the drop terminal 240, a drop cable 255 can be plugged into an empty port 245'. When plugged in, the drop cable 255 receives the multiplexed signal carried over the distribution fiber 235 coupled to the second feeder cable 216. An opposite end of the drop cable 255 is coupled to the remote unit 260. In certain implementations, the drop cable 255 is ruggedized (e.g., enclosed and/or sealed against environmental contamination). In certain implementations, multiple remote units 260 can connect to one drop terminal 240 with respective drop cables 255 (e.g., see the top drop terminal 240 shown in FIG. 3). In certain implementations, signals from the second feeder 216 are provided to multiple drop terminals 240 (e.g., see FIG. 3). For example, certain types of second feeders 216 can include multiple feeder fibers.

Figure 4:
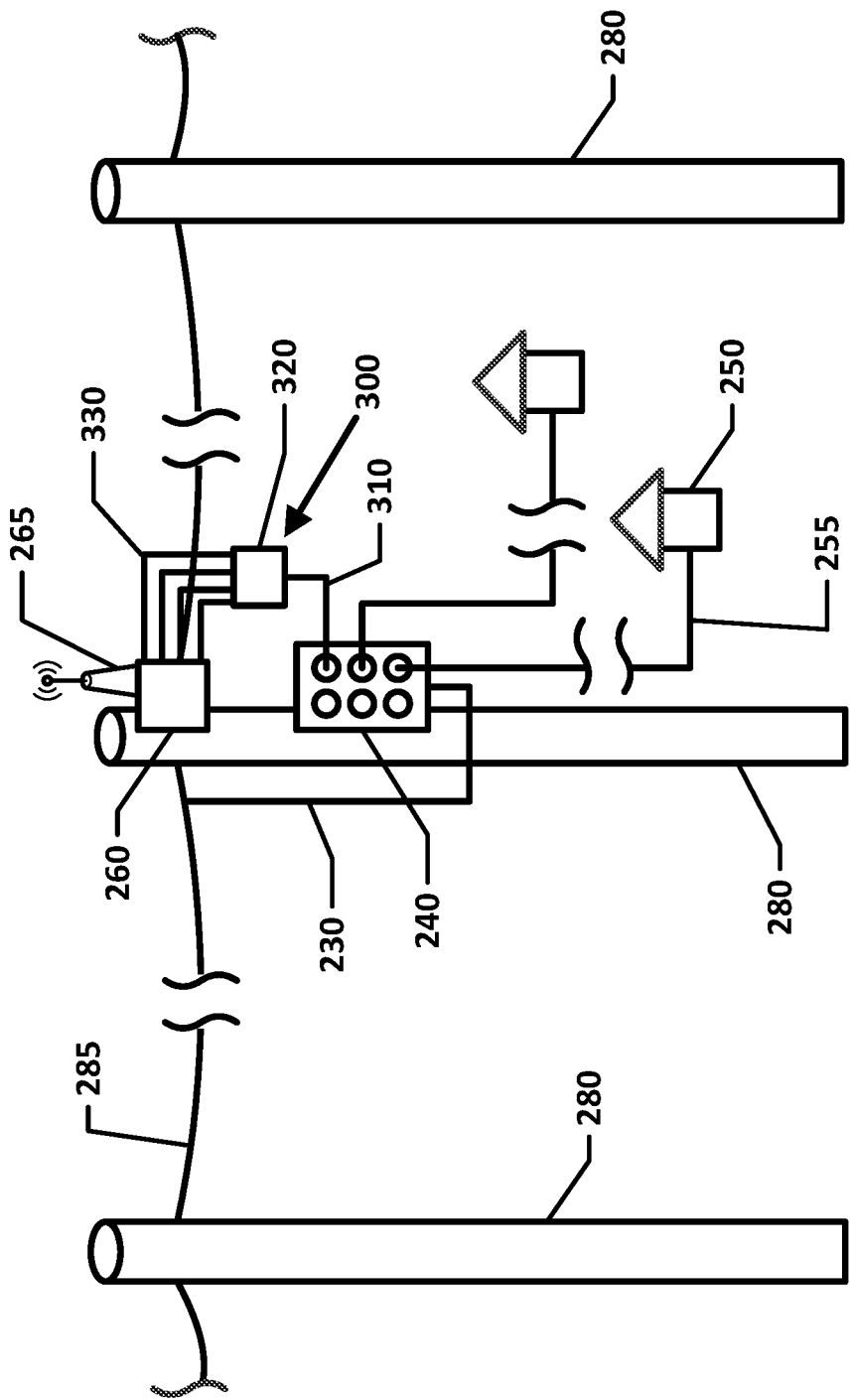
FIG. 4 illustrates the drop terminal and remote unit of FIG. 3 mounted to a pole in the field.

FIG. 4 shows one example drop terminal 240 deployed in the field. In the example shown, the drop terminal 240 is mounted to one of a plurality of poles 280 (e.g., telephone pole, light pole, etc.). Various cables 285 (e.g., power cables, other optical cables, etc.) are routed between the poles 280. The routed cables 285 include the distribution cable 230. In some implementations, a connectorized end of a distribution cable 230 is plugged into an input port of the drop terminal 240. In other implementations, the distribution cable 235 includes a connectorized input stub of the drop terminal 240 routed along the poles 280 (and/or through underground conduits) to the FDH 220. In some implementations, one or more drop cables 255 can be routed from the drop terminal 240 to end subscribers 250.

In the example shown, an outdoor remote unit 260 also is mounted to the pole 280. In other implementations, however, the remote unit 260 can be mounted to a different pole 280 or at a different location adjacent the pole 280. In still other implementations, the remote unit 260 can be mounted to the pole 280 and the drop terminal 240 can be mounted to an adjacent location. In some implementations, a drop cable 255 can be routed between the empty port 245 and the remote unit 260. In other implementations, the remote unit 260 can be connected to the empty port 245' using a cable arrangement 300 (FIG. 4) that multiplexes and demultiplexes the optical signals passed between the port 245 and the remote unit 260.

Figure 5:
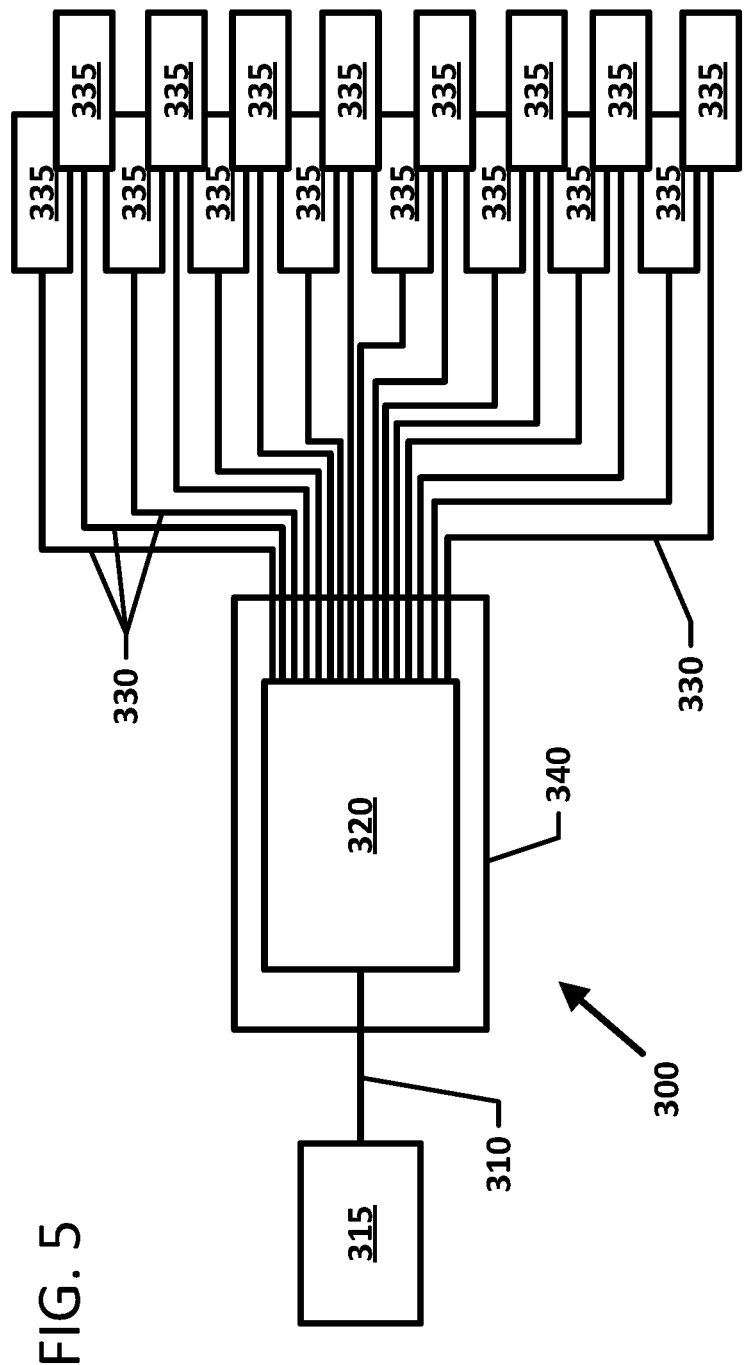
FIG. 5 is a schematic diagram of a cable arrangement suitable for connecting the drop terminal and the remote unit of FIGS. 3 and 4.

FIG. 5 illustrates one example cable arrangement 300 suitable for use in connecting a remote unit 260 to a drop terminal 240. The cable arrangement 300 includes a wave division multiplexer (WDM) 320 disposed between a single optical fiber 310 and multiple optical fibers 330. In some implementations, between two and sixty-four fibers 330 extend from the WDM 320. In certain implementations, between four and thirty-two fibers 330 extend from the WDM 320. In certain implementations, between eight and twenty-four fibers 330 extend from the WDM 320. In an example, about sixteen fibers 330 extend from the WDM 320. In other implementations, any desired number of fibers 330 can extend from the WDM 320.

The WDM 320 demultiplexes optical signals carried by the single optical fiber 310 from the drop terminal 240 and routes the demultiplexed signals to the multiple optical fibers 330. Each optical fiber 330 carries an optical signal having a different wavelength (or wavelength band) from the optical signals carried on the other fibers 330. The WDM 320 also multiplexes optical signals carried by the multiple optical fibers 330 from the remote unit 260 and routes the multiplexed signal to the single optical fiber 310. In certain implementations, the WDM 320 includes a passive WDM. In an example, the WDM 320 is a standard WDM. In another example, the WDM 320 is a coarse wave divisional multiplexer (CWDM). In another implementation, the WDM 320 is a dense wave divisional multiplexer (DWDM), which can separate out more signals than a CWDM.

Certain example standard WDMs provide up to eight channels in the third transmission window (1530 to 1565 nm). Certain example DWDM use the same transmission window, but with denser channel spacing. For example, certain DWDMs can use forty channels at 100 GHz spacing or eighty channels with 50 GHz spacing. A CWDM uses increased channel spacing. Accordingly, eight channels on an example single fiber CWDM can use the entire frequency band between second and third transmission window (1260 to 1360 nm and 1530 to 1565 nm).

In some implementations, the wave division multiplexer 320 of the cable arrangement 300 is sealed from the outside environment. For example, the wave division multiplexer 320 can be overmolded or otherwise enclosed in a protective closure or seal 340. In certain implementations, portions of the single optical fiber 310 and multiple optical fibers 330 also are included within the sealed enclosure 340. In certain implementations, the single fiber 310 and multiple fibers 330 are separately ruggedized (e.g., have hardened outer jackets, etc.).

A distal end of the single optical fiber 310 is terminated by an optical connector 315 to enable the distal end to be plugged into the empty port 245' at the drop terminal 240. Distal ends of the multiple optical fibers 330 also are terminated by optical connectors 335 to enable the distal ends to be plugged into ports at the remote unit 260. Non-limiting examples of optical connectors 315, 335 suitable for terminating the optical fibers 310, 330 include SC-connectors, LC-connectors, LX.5-connectors, ST-connectors, and FC-connectors. In certain implementations, the optical connectors 315, 335 terminating the optical fibers 310, 330 are hardened optical connectors. Non-limiting examples of hardened optical connectors are disclosed in U.S. Pat. Nos. 7,744,288 and 7,113,679, the disclosures of which are hereby incorporated herein by reference.

In some implementations, the multiple optical fibers 330 of the cable arrangement 300 can be plugged into ports (e.g., receive ports (Rx) and transmit ports (Tx)) of a DAS remote access unit 260. In certain implementations, the optical signals passing through each port have a different wavelength or wavelength band than the optical signals passing through the other ports. In certain implementations, pairs of optical fibers 330 can be terminated at duplex optical connectors and plugged into corresponding receive and transmit ports. Each pair of ports (Rx, Tx) corresponds with a different provider (e.g., a mobile phone service provider) and/or different telecommunications standard (e.g., LTE, 4G, and 3G, such as GSM, CDMA, EDGE, UMTS, DECT, WiMAX).

For example, a first pair of fibers 330 can bi-directionally carry a signal corresponding to a first band for a first provider; a second pair of fibers 330 can bi-directionally carry a signal corresponding to a second band for the first provider; and a third pair of fibers 330 can bi-directionally carry a signal corresponding to a first band for a second provider. In other implementations, each individual fiber can be associated with a separate band and/or provider.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A wave division multiplexing cable arrangement comprising:
   a sealed enclosure defining an interior;
   a wave division multiplexer disposed within the sealed enclosure, the wave division multiplexer being configured to multiplex optical signals received at an input line onto a plurality of ruggedized output cables having distal ends accessible from an exterior of the sealed enclosure, the wave division multiplexing arrangement forming part of a cable having a first end at a ruggedized optical connector terminating a distal end of the input line and an opposite second end at ruggedized optical connectors terminating the distal ends of the output cables; and
   a drop terminal having an input and a plurality of outputs;
   wherein the ruggedized optical connector terminating the distal end of the input line of the wave division multiplexer is plugged into one of the outputs of the drop terminal.

2. The wave division multiplexing arrangement of claim 1, wherein the wave division multiplexer is a coarse wave division multiplexer.

3. The wave division multiplexing arrangement of claim 1, wherein the input line extends through the sealed enclosure to provide the optical signals to the wave division multiplexer.

4. The wave division multiplexing arrangement of claim 3, wherein the input line is ruggedized.

5. The wave division multiplexing arrangement of claim 3, wherein the input line is connectorized.

6. The wave division multiplexing arrangement of claim 1, wherein the output cables include ruggedized cables extending outwardly through the sealed enclosure.

7. The wave division multiplexing arrangement of claim 6, wherein distal ends of the output cables are terminated by ruggedized optical connectors.

8. The wave division multiplexing arrangement of claim 1, wherein the wave division multiplexer is overmolded to form the sealed enclosure.

9. The wave division multiplexing arrangement of claim 1, wherein the ruggedized output cables are plugged into ports of a separate housing.

10. The wave division multiplexing arrangement of claim 9, wherein the housing is a remote unit.

11. The wave division multiplexing arrangement of claim 9, wherein the ports include a transmit port and a receive port.

12. The wave division multiplexing arrangement of claim 1, wherein the wave division multiplexer has eight output cables.

13. The wave division multiplexing arrangement of claim 1, wherein the wave division multiplexer has between two and sixty-four outputs.

14. The wave division multiplexing arrangement of claim 13, wherein the wave division multiplexer has between four and thirty-two outputs.

15. The wave division multiplexing arrangement of claim 13, wherein the wave division multiplexer has between eight and twenty-four outputs.

16. The wave division multiplexing arrangement of claim 1, wherein the wave division multiplexer is a dense wave division multiplexer.

17. The wave division multiplexing arrangement of claim 1, wherein pairs of the output cables are terminated at duplex optical connectors.

* * * * *